United States Patent [19]

Gochanour et al.

[11] 3,828,794
[45] Aug. 13, 1974

[54] CROP-DIVERTING SHED BAR AND BEARING PROTECTOR FOR AXIAL FLOW-TYPE COMBINES

[75] Inventors: Carroll Q. Gochanour, Moline; Richard A. DePauw, East Moline, both of Ill.

[73] Assignee: International Harvester Company, Chicago, Ill.

[22] Filed: June 29, 1973

[21] Appl. No.: 375,270

[52] U.S. Cl. ............................................ 130/27 T
[51] Int. Cl. ............................................ A01f 7/06
[58] Field of Search ............... 130/27 R, 27 L, 27 T

[56] References Cited
UNITED STATES PATENTS

| | | |
|---|---|---|
| 3,122,499 | 2/1964 | Witzel et al. .................... 130/27 T |
| 3,572,346 | 3/1971 | Knapp et al. .................... 130/27 T |
| 3,669,122 | 6/1972 | Rowland-Hill .................. 130/27 T |
| 3,742,686 | 7/1973 | Rowland-Hill .................. 130/27 T |

*Primary Examiner*—Antonio F. Guida
*Attorney, Agent, or Firm*—F. David AuBuchon; Floyd B. Harman

[57] ABSTRACT

A combined crop-diverting shed bar and bearing protector for the rotor shaft of an axial flow-type combine. A unitary casting is fixedly secured to a structural element of the combine chassis and serves the multiple purpose of diverting the crop material, which is fed endwise against a rotating impeller, radially outwardly and away from the centrally located bearing which supports the rotor shaft, and of affording a protective shield for the bearing against the infiltration of dust or other foreign matter.

11 Claims, 11 Drawing Figures

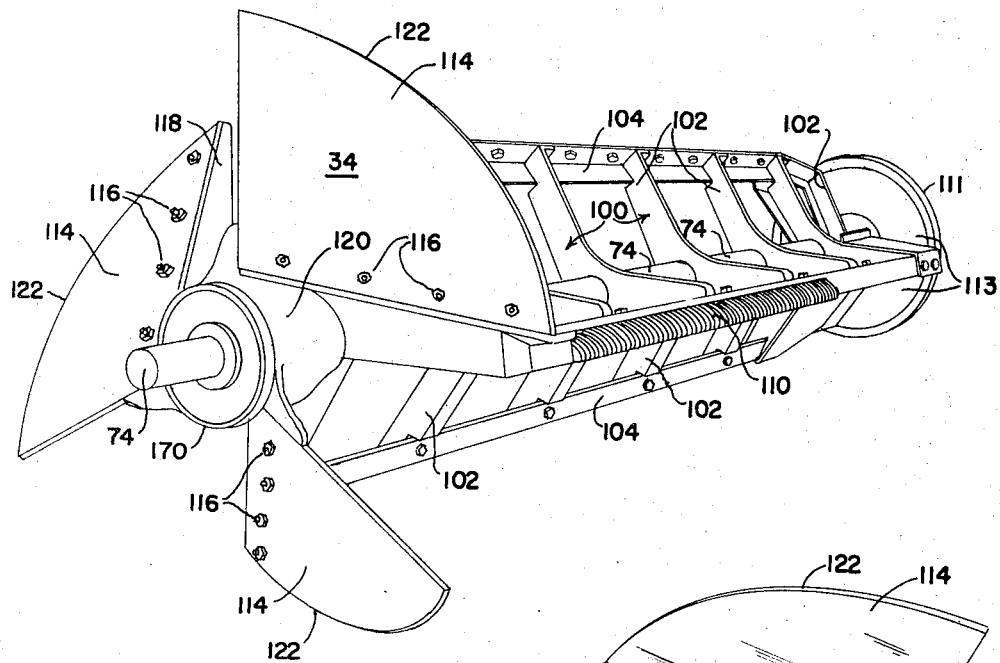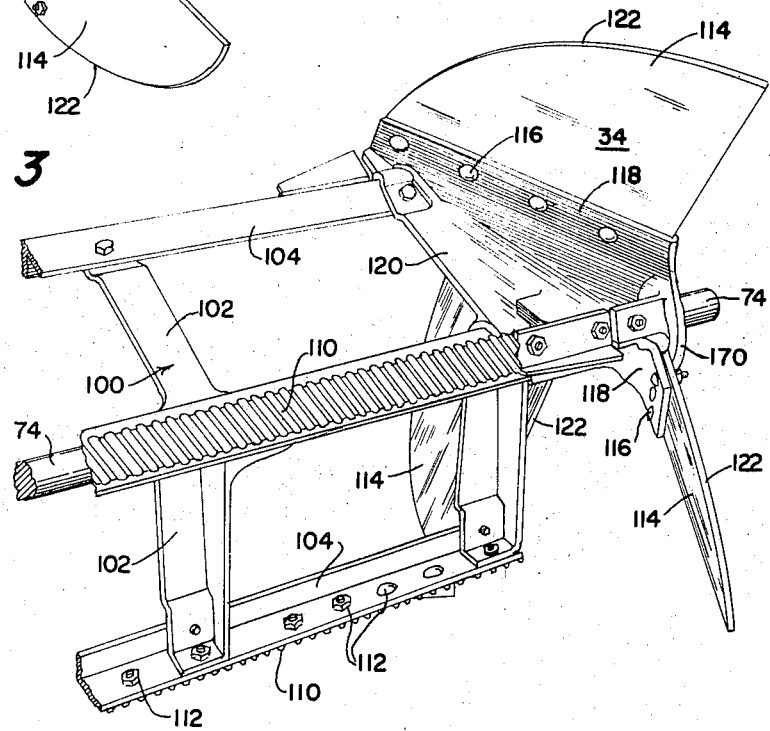

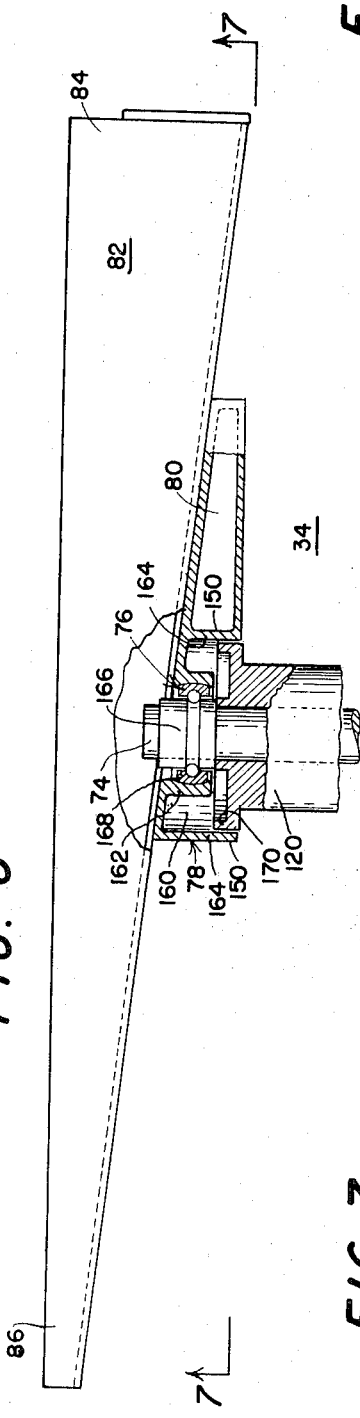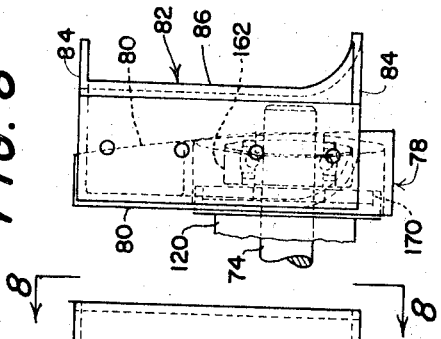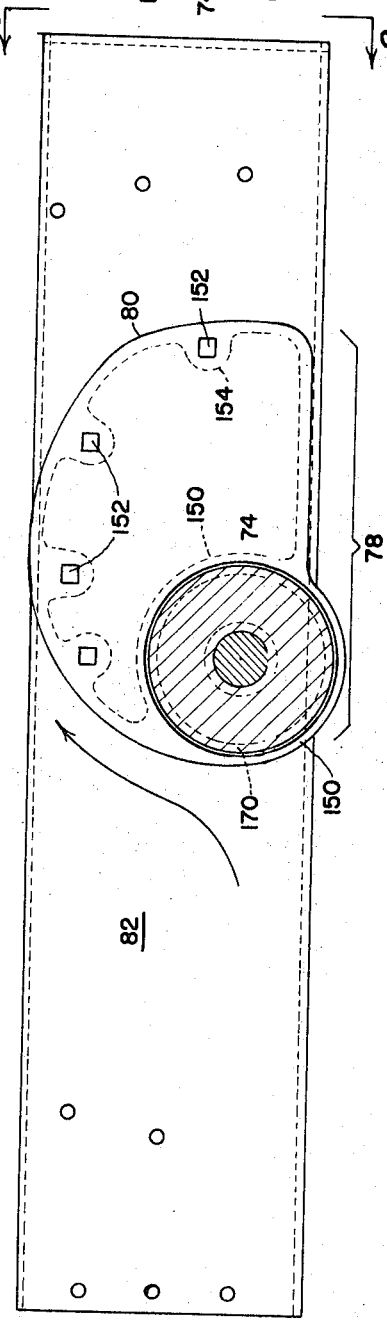

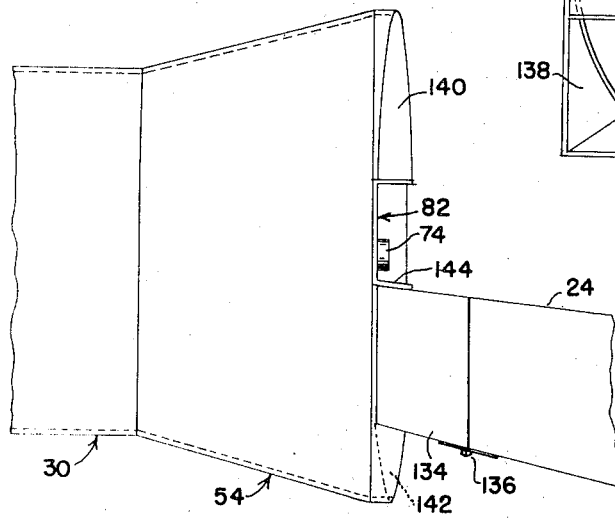
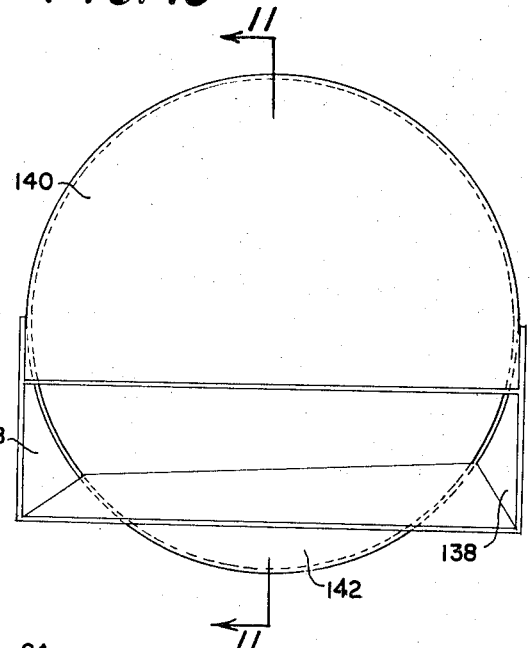
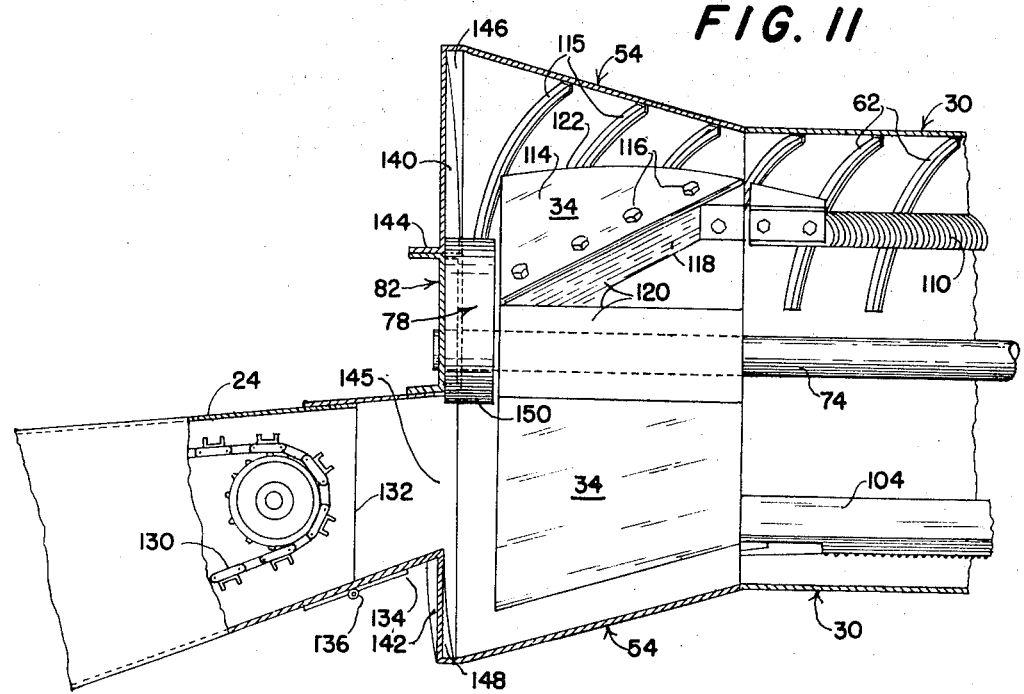

CROP-DIVERTING SHED BAR AND BEARING PROTECTOR FOR AXIAL FLOW-TYPE COMBINES

The present invention relates generally to harvesting combines and has particular reference to that type of combine which is commonly referred to as an axial flow combine and wherein the crop material flows axially through an open-ended casing within which there is disposed a rotor. The invention is specifically concerned with the provision of a novel protective bearing support for the front end of the rotor and which, in addition to its supporting and shielding functions, further embodies a crop-diverting member which, by a camming action, imparts an outward radial componenet of motion to crop material which is fed to the rotor in the vicinity of the bearing, thus carrying such material away from the bearing and thereby augmenting the protective function of such bearing support. Inasmuch as such crop material is conducted by the crop-diverting member outwardly and away from the front rotor bearing and is thus radiated or diffused, such member will hereinafter be referred to as a "shed bar", such term being in accordance with ordinary dictionary definitions. Additionally, by reason of the fact that the crop material is carried by the shed bar to a peripheral region of the casing which encloses the rotor, such material does not in quantity enter the central confines of the vaned impeller which invariably is disposed at the forward end of the rotor but, instead, is applied to the rotor vanes in the outer regions tehreof, thus obviating any tendency for the straw or other long grasses to bridge adjacent impeller vanes or otherwise wrap itself about the impeller and thus clog the crop entrance region of the rotor casing. The provision of such a bearing support constitutes the principal object of the present invention.

In carrying out this object, the invention contemplates the provision of a novel bearing support which, preferably, is in the form of a unitary integral casting fixedly mounted on an appropriate stationary part of the combine chassis as, for example, on the front transverse support bar which ordinarily projects across the front end of the rotor casing in diametric fashion. The casting embodies a central hub which defines a central recess within which the bearing is encased, the recess having a circular rim region which receives therein a circular sealing disk provided on the forward end of the rotor shaft. The aforementioned shed bar is in the form of a radial projection on the hub, such projection having an appreciable and effective radial extent and presenting a cam surface which opposes the direction of impeller-induced swirling movement of the crop material. This surface is smooth and arcuate so that the material, instead of wrapping itself about the rotor shaft, or of bridging adjacent impeller vanes, tends to wrap itself about such surface. However, because the surface is smooth and uninterrupted, and is of appreciable radial extent, the material slides thereover and is flung by centrifugal force therefrom so that it is shed into the peripheral regions of the rotor casing.

Other objects and advantages of the invention, not at this time enumerated, will become readily apparent as the following description ensues.

In the accompanying five sheets of drawings forming a part of this specification, one illustrative embodiment of the invention has been shown.

BRIEF DESCRIPTION OF THE DRAWINGS

FIG. 2 is an enlarged isolated front perspective view of an elongated impeller and rotor assembly which is employed in connection with the invention;

FIG. 3 is a fragmentary rear side perspective view of the front end portion of the structure shown in FIG. 2;

FIG. 6 is a sectional view taken substantially on the line 6—6 of FIG. 4, the view being taken from the viewing angle of the operator of the combine;

FIG. 7 is a sectional view taken substantially on the line 7—7 of FIG. 6;

FIG. 8 is an end view of the structure shown in FIG. 7, the view looking in the direction of the arrows associated with the line 8—8 of FIG. 7;

FIG. 9 is a front right outside elevational view, largely schematic in its representation, of the forward region of the elongated rotor casing, together with a portion of the crop feeding means;

FIG. 10 is a front end and similarly schematic view of the structure shown in FIG. 9; and FIG. 11 is a detailed sectional view taken on the line 11—11 of FIG. 10.

Figure 1:
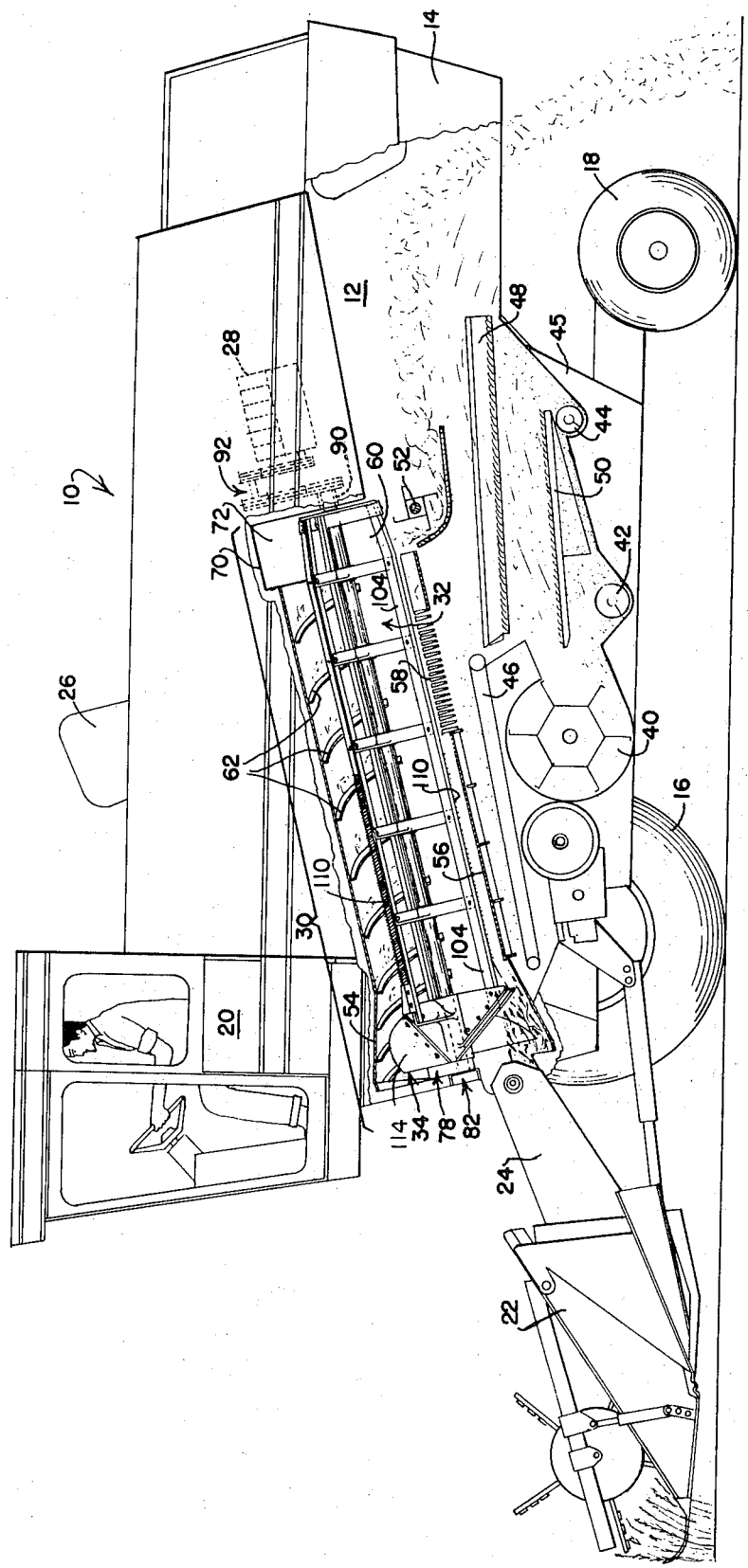
FIG. 1 is a side elevational view of an axial flow-type combine embodying the principles of the present invention, a major portion of one side wall being removed to reveal the crop-impelling means, the crop gathering means, the crop feeding means, the axial threshing and separating means, the grain cleaning and handling means, and the residue discharge means.

Referring now to the drawings in detail and in particular to FIG. 1, an axial flow-type combine is designated in its entirety by the reference numeral 10, the combine being of the general type shown and described in U.S. Pat. No. 3,481,342, granted on Dec. 2, 1969 and entitled AXIAL FLOW-TYPE COMBINE. The combine involves in its general organization a chassis or body portion 12 having vertical side walls 14, the body portion being supported by a pair of relatively large drive wheels 16 in the front region of the combine, and a pair of steerable or dirigible wheels 18 at the rear of the combine. The combine further includes an operator's platform and a cab 20, a crop-gathering header 22, a feeder 24, a grain elevator 26 and an engine 28. A grain tank (not shown) is enclosed within the walls of the body portion 12. As is the case in connection with axial flow-type combines of the character under consideration, the axial threshing and separating means are embodied in a single unit in the form of an elongated and generally cylindrical member 30 in the form of a rotor casing having a rotor 32 mounted therein. The forward end of the rotor 32 carries a vaned impeller 34 of the helix type. The present invention is concerned primarily with the nature of the rotor casing 30 and its associated rotor 32, and especially with the character of the impeller 34 and the manner in which it cooperates with the rotor casing 30, the invention also having a relation to the front bearing support for the rotor, such bearing support having associated therewith bearing protecting means and an anti-wrap feature which inhibits the unthreshed straw or other crop material undergoing gathering from becoming wrapped about the axis of the rotor or the leading edges of the impeller. The invention is further related to a slanted-plane transition crop feeding means at the front end of the cylindrical rotor casing 30 and by means of which the unthreshed material which is fed into the forward end of such casing from the feeder 24 is brought into camming engagement with a pair of smooth flat imperforate guide plates by means of which such material is guided circumferentially and rearwardly and is thus moved uniformly into the working area of the impeller. These several features of the invention will be described in detail subsequently when the nature of the present axial flow-type combine is better understood.

Other conventional combine components not specefically related to the present invention, and which are more or less schematically disclosed herein, are the blower 40, grain auger 42 leading to the aforementioned grain elevator 26, and tailings auger 44, these components being enclosed within a lower casing section 45 beneath the chassis or body portion 12. Enclosed within the body portion 12 beneath the cylindrical member 30 is an elongated generally flat endless conveyor 46 which receives separated grain from the concave and grate sections of such member and conducts such grain rearwardly for discharge onto a chaffer sieve 48. Such sieve is reciprocated in a fore and aft direction so as to pass grain and tailings to a grain sieve 50 which also is reciprocated to separate the grain from the tailings so that the grain passes through such sieve and into the grain auger 42 while the tailings are delivered rearwardly to the tailings auger 44. The grain in the auger 42 is delivered through the elevator means 26 to the grain tank, while the tailings are returned to the cylinder 30 by elevator means (not shown). A terminal beater 52 which is disposed beneath the rear end of the cylindrical member prepares the straw residue for discharge from the combine rearwardly thereof.

Still referring to FIG. 1, the elongated cylindrical rotor casing 30 extends along the longitudinal axis of the combine 10 and the forward end thereof is provided with a frusto-conical transition section 54 which is so termed because it represents a funnel-like entrance mouth by means of which material that is fed rearwardly from the feeder 24 in the form of a relatively wide mat is shrunk, so to speak, and caused to enter the remaining portion of the rotor casing for threshing and separating functions which are performed within the casing upon this material.

As will be described in greater detail presently, the impeller 34 is provided with a vane arrangement which closely mates with the inner frusto-conical surface of the transition section 54, this feature constituting an important aspect of the present invention. The material which enters the truly cylindrical portion of the casing 30 is processed as it travels rearwardly, the threshed grain escaping from the casing through the apertured bottom which is made up of a concave 56 and a grate 58. The straw and other waste material is discharged through a straw discharge opening 60 formed in the lower region of the rear end portion of the casing 30. A plurality of spiral transport fins 62 are fixedly secured to the upper internal surface of the cylindrical member 30, these fins functioning to index the material axially through the casing from the frusto-conical transition section 54 to the straw discharge opening 60.

The lower region of the elongated cylindrical rotor casing 30 is approximately the forward half thereof is defined by the provision of the aforementioned perforate concave 56 (see also FIG. 5), the perforations therein being of a size which will permit the passage of grain therethrough. The lower region of the rear half of the casing 30 is defined by the provision of the aforementioned perforate grate 58 which is less aggressive than is the concave 56 and which is provided with smaller apertures. Both the concave 56 and grate 58 are conventional in their structural make-up, the concave including a plurality of parallel ribs through which a series of small diameter wires extend, and the grate 58 being comprised of a curved sheet of perforated flat metal stock. Preferably the concave is provided with adjusting means (not shown) by means of which it may be adjusted relative to the axis of the rotor 32, and also with means whereby it may be removed from the combine for purposes of cleaning, repair or replacement, such means constituting the subject matter of a copending United States application, now U.S. Pat. No. 3,470,881, issued Oct. 7, 1969, and entitled Accessible Concave. The grate 58 is likewise preferably removable to the end that grates having appropriate size apertures for varying crops may be interchanged.

Figure 5:
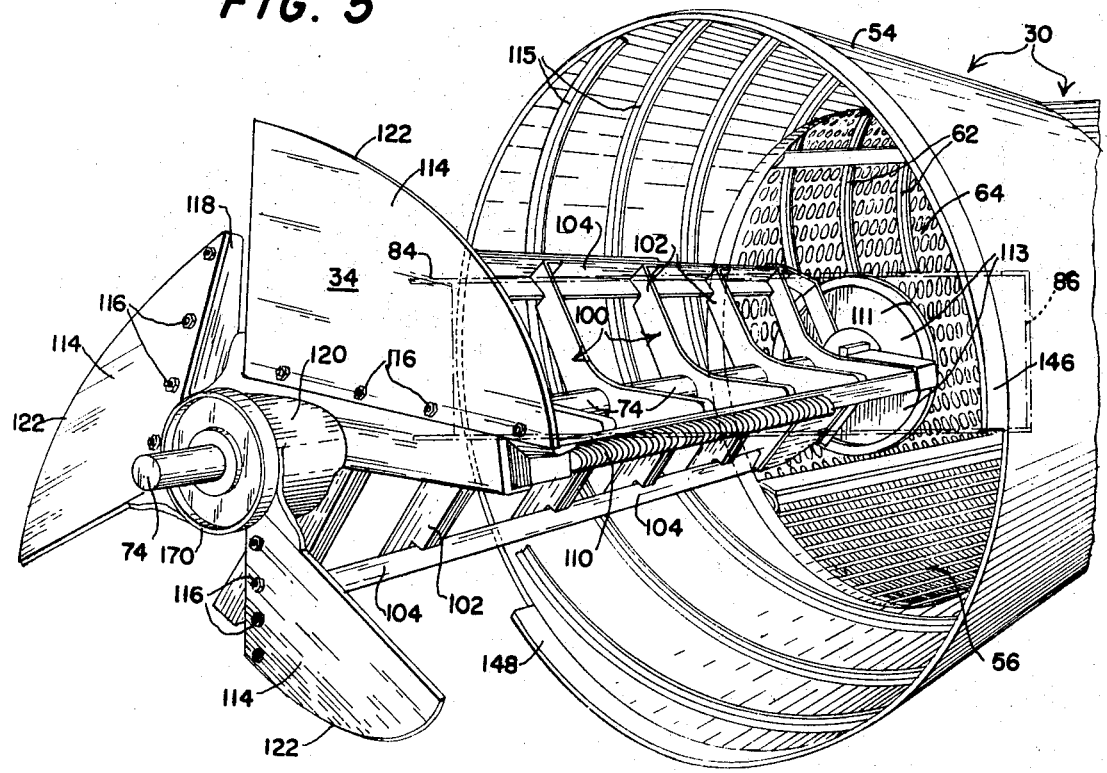
FIG. 5 is an exploded fragmentary front perspective view of the rotor casing and its associated rotor, the front end wall of such casing being removed in the interests of clarity.

Still referring to FIGS. 1 and 5, and considering a viewing angle which looks axially into the rotor casing 30 from the front end thereof, the concave 56 occupies a sector which is of approximately 120° extent and which extends from the three o'clock position to the seven o'clock position. To the left of the concave 56 is a preliminary grate 64 which extends approximately from the seven o'clock position to the eleven o'clock position, such grate being coextensive with the concave 56 in a longitudinal direction and defining approximately a 120° sector. The remainder of the rotor casing 30 exclusive of the transition section 54 and the enlarged diameter section 70 is perforated.

The rear end of the rotor casing 30 is formed with an enlarged diameter section 70 which defines in effect a cylindrical expansion chamber 72 within which the straw or crop residue which approaches the rear end of the casing is given a swirling motion by the rotor 32 so that it is thus loosened and caused to be flung by centrifugal force through the discharge opening 60.

Figure 4:
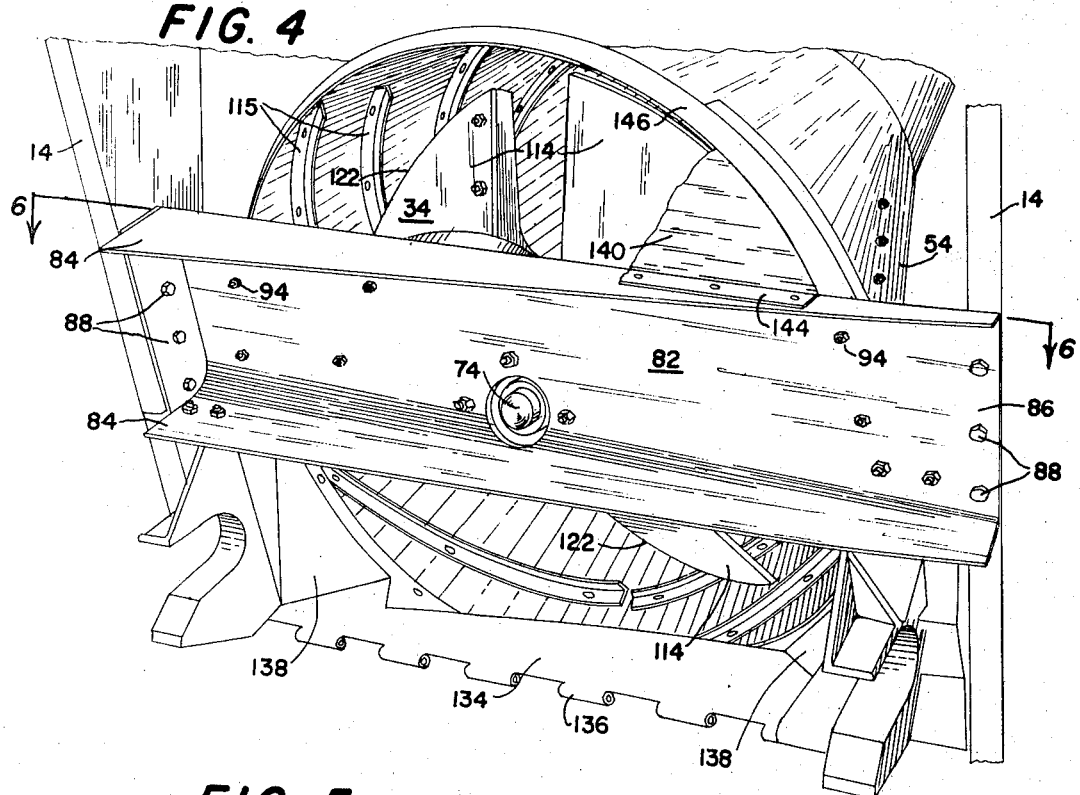
FIG. 4 is a fragmentary front perspective view of the forward portion of the threshing portion of the combine looking rearwardly into the front crop-receiving end of the elongated cylindrical rotor casing which, in combination with its associated rotor, establishes the axial threshing and separating means, a portion of the upper front closure sheet which extends across the casing being broken away in the interests of clarity.

The rotor 32 is rotatably journalled for operation within the rotor casing 30, its direction of rotation being counterclockwise as viewed from the front of the combine, for example as seen in FIGS. 2, 4 and 5. The rotor involves in its general organization a central axial rotor shaft 74 which has its forward end rotatably journalled in a shielded bearing assembly 76 (FIGS. 6 and 7) which is supported by and enclosed within a casting 78 having a radially offset portion 80 which will hereinafter be referred to as an anti-wrap shed bar inasmuch as its function is to divert the crop material entering the rotor casing 30 and prevent the same from bridging across the front of the impeller blades and forming a torus which, otherwise, would block the path of other material entering between such blades. The casting 78, in addition to functioning as a bearing support and antiwrap member, further functions as a bearing shield and protector as will be described in detail presently.

The casting 78 is, in turn, fixedly supported at the medial region of a transverse rotor supporting member 82 (FIGS. 1, 4, 6, 7 and 11), such member being generally of forwardly facing channel-shape construction and having upper and lower horizontal side flanges 84 which taper in width from left to right as viewed in FIG. 4 for a purpose that will be made clear subsequently, and a connecting vertical web potion 86. The opposite ends of the channel-like member 82 are variously secured by bolts 88 (FIG. 4) to portions of the combine side walls 14.

The rear end of the rotor shaft 74 is rotatably journalled in a transverse bar or channel 90 which constitutes an element of the combine chassis 12. A Reeves drive or other type of variable pitch belt and pulley mechanism 92 extends between the rear end of the shaft 74 and the engine 28 and establishes a driving connection from the engine. The rotor casing 30 is also supported at its rear end from the transverse bar 90 while the front end of the casing is similarly supported from the aforementioned channel member 82, the forward rim of the frusto-conical transition section 54 being bolted to such member as indicated at 94 in FIG. 4.

In addition to the impeller 34, the rotor 32 is provided with a series of longitudinally spaced three-arm spiders 100 (FIGS. 2 and 3) having radial arms 102 which, at their outer ends, carry longitudinally extending blades 104, the latter being in the form of lengths of structural angle pieces. The spiders are fixedly secured to the rotor shaft 74 at spaced regions therealong and corresponding arms 102 thereof are in longitudinal alignment so that the blades 104 may bridge the outer ends of such arms and thus assume circumferential positions in the rotor assembly which are disposed 120° apart. Reference to FIG. 1 will reveal the fact that approximately the forward halves of the blades 104 extend through the threshing area of the casing 30 and cooperate with the concave 56 and preliminary grate 64, while the rear halves of the blades 104 extend through the separating area of the casing 30. Aggressive means in the form of conventional rasp bars 110 are secured by bolts 112 (FIG. 3) to the outer surfaces of the longitudinally extending blades 104 in the threshing area of the casing and cooperate with the concave 56 and preliminary grate 64 in the usual manner for crop threshing purposes during rotation of the rotor 32. A terminal disk 111 (FIGS. 2 and 5) which is formed in three sectors 113 is disposed near the rear end of the rotor 30 and the radial edges of the sectors 111 are anchored to the adjacent spider arms 102. The threshed and separated grain passing through the concave 56 and grate 64 falls by gravity onto the flat endless conveyor 46 and is conducted rearwardly as previously described to the chaffer sieve 48.

Considering now the frusto-conical transition section 54 of the rotor casing 30 and its associated impeller 34, and referring particularly to FIGS. 1, 4, 5 and 11, such transition section and impeller constitute one of the principal features of the present invention. The section 34 may be regarded as a forward extension of the cylindrical rotor casing proper and its conical characteristics are such that it has a slant angle on the order of from 15° to 20° and a relatively short slant height. The function of the transition section 34 is to "funnel" the crop material into the cylindrical section of the rotor casing 30 and thus permit the use of an impeller which has an overall mean diameter which is appreciably larger than the maximum diameter which is permissible in the absence of the transition section. A plurality of spiral transport fins 115 which are similar to the fins 62 are provided internally on the wall of the transition section 64. By the use of such transition section in combination with a correspondingly shaped impeller, the width of the feeder 24 is not limited by the diameter of the cylindrical portion of rotor casing 30 and, furthermore with such a rotor, since the material-moving capacity of the average bladed impeller is an algebraic function of its diameter (other things being equal), an appreciable excess of crop material may be fed into the cylindrical working section of the rotor casing when even a small increase in impeller diameter is involved.

The impeller 34 includes a plurality of vanes or helix flights 114 (FIGS. 2 to 5 inclusive) which are in the form of generally flat triangular sheet metal vanes which have their inner linearly straight edges secured by bolts 116 to a series of bolting flanges 118 provided on a central hub 120 which is fixedly mounted on the rotor shaft 74. Preferably the number of vanes correspond to the number of rotor blades 104, there being three such vanes in the illustrated embodiment of the combine. As best seen in FIG. 3, the vanes are staggered in a circumferential direction relative to the blades 104 so that each vane longitudinally opposes the void which exists between a pair of adjacent blades. As clearly shown in FIGS. 2 and 3, each generally triangular vane 114 has a linearly straight substantially radially extending leading edge 121, and an arcuate outer edge 122.

According to the present invention, the extended outline of the three vanes or flights 114 generates a cone frustum having a slant angle which is substantially equal to the slant angle of the frusto-conical transition section 54 of the rotor casing 30 so that the small clearance which exists between each arcuate outside edge 122 and the adjacent inner surface of the transition section 54 is substantially constant throughout the extent of such edge. Specifically, since the vanes 114 are substantially planar, the extended planes thereof intersect the cone frustum of the transition section 54 along approximately parabolic lines, such being the conic section which results from the intersection of a plane and a cone frustum. Thus, to maintain such constant clearance between the vanes 114 and the transition section 54, the outer edges 122 of the vanes 114 are preferably of substantially parabolic curvature.

Referring now to FIGS. 1, 9, 10 and 11, the feeder 24 which is of conventional construction is provided with an internal crop-elevating conveyor 130 (FIG. 11) which carries the gathered crop upwardly and rearwardly and discharges the same through a rectangular discharge opening 132 from whence it enters a short rectangular crop inlet conduit 134 which communicates with the interior of the frusto-conical transition section 54 of the rotor casing 30 in an axial direction and at a location appreciably below the longitudinal axis of the latter. The forward end of the feeder 24 is telescopically received within the crop inlet conduit 134 and is connected thereto by a hinge 136. The conduit 134 is somewhat wider than the lower region of the transition section 54 with which it communicates and, therefore, in order to direct all of the gathered crop material into the section 54, a pair of generally triangular gusset-like web pieces 138 (FIG. 10) fold and funnel the edge regions of the generally flat mat of crop material inwardly so that it will enter the transition section 54.

It has been found that in connection with axial flow-type combines of the character under consideration it is necessary to provide a forward end wall for the front end of the rotor casing so as to confine the crop material which is fed into the forward end of the casing since there is a considerable backlash of material which is "chewed" from the rearwardly advancing mat of crop material issuing from the feeder 24 and passing through the conduit 134. Where a circular transverse planar forward end wall is employed, it has been found that this backlash of crop material impacts against such end wall, builds up thereon, and ultimately forms a circular cake which clogs the impeller due to the upthrust of material on one side of the rotor casing and the downthrust of material on the other side thereof. Thus a rotating circular disk of the material is created within the casing in advance of the impeller and as this disk becomes thicker, it finally establishes a solid circular mat which can no longer rotate and ultimately produces a condition of engine stall. To obviate this difficulty, the present combine employs what is herein termed a slanted-plane transition feed arrangement whereby the material is given a rearward impetus as soon as it enters the rotor casing and is carried well into the working area of the impeller blades 114 and away from the front closure wall before it has had time to build up in the form of a cake. This herein termed slanted plane transition feed arrangement constitutes the subject matter of a copending United States application, Ser. No. 375,207, filed on June 29, 1973 and entitled CROP FEEDING MECHANISM FOR AXIAL FLOW-TYPE COMBINES.

In the following description of such slanted plane feed arrangement, it should be borne in mind that directional references to "right" and "left" as related to either the right and left side of the combine, or to the transverse components of crop movement across the entrance region of the transition section 54 of the rotor casing 30, are related to the operator's position within the cab 20. Thus the left side of the combine is to be regarded as that side which is to the left of the operator and any transverse components of movement of the crop material within the confines of the transition section 54 are referred to as either right or left movements on the same directional basis.

This so-called slanted plane transition feed arrangement is so designed that it provides a generally circumferential path of movement for the crop material after it has entered the confines of the transition section 54, such path having a rearward component of motion and consisting of slightly less than one complete circumferential sweep. Stated otherwise, the path of movement of the crop material after it enters the confines of the transition section and before it moves completely into the working area of the impeller 34 is generally helical and consists of less than one helix turn. Bearing in mind that the rotor 32 turns on a counterclockwise direction as viewed from the front end thereof, the crop material of the crop web issuing from the feeder 24 tends to be elevated by the upwardly moving vanes 114 which pass across the general plane of the crop web issuing from the feeder 24 at the right side of the latter. This material is picked up by the rising vanes 114 and swept upwardly and to the left over the upper region of the transition section 54 and during this circumferential movement of the material it is forced rearwardly into the working area of the impeller. Subsequently, as the vanes on the left side of the transition section 54 descend, fresh material is removed from the forward edge of the crop mat and carried downwardly, during which time it is similarly forced rearwardly and into the working area of the impeller.

This path of circumferential movement for the crop material on opposite sides of the transition section 54 is afforded by the provision of two flat transition sheets including an upper semicircular sheet 140 and a lower semicircular sheet 142 (FIGS. 4, 10 and 11). These two sheets, in effect, constitute an end closure wall for the rotor casing 30 which is imperforate except for the provision of the intervening rectangular crop feed opening 143 (FIG. 11) which exists between the opposed horizontal edges of the two sheets.

Each of the two sheets 140 and 142 is of semicircular configuration and each encompasses a minor circle sector, the upper sheet 140 having a bolting flange 144 (FIGS. 4, 6, 9 and 11) along its lower edge which is secured to the upper channel flange 84 of the rotor supporting channel member 82. The crop feed opening 144 lies slightly below the level of the rotor 74 and thus the upper sheet 140, in combination with the web portion 86 of the member 82, closes off a major circle area of the large base of the cone frustum defined by the transition section 54. The lower sheet 142 similarly closes off a minor circle area of such large base of the cone frustum, the two sheets and the member 82 defining the rectangular crop feed opening 145 therebetween. The sheets 140 and 142 are slanted in different directions, the upper sheet 140 slanting to the left and rearwardly as clearly shown in FIGS. 9 and 11, and the lower sheet 142 slanting to the right and rearwardly. The lower sheet 142 may be integrally formed on the bottom wall of the aforementioned crop inlet conduit 134. The arcuate periphery of the upper sheet 140 is connected to the forward open rim of the transition section 54 by a curved tapered fill-in strip 145 (FIGS. 4 and 5). The arcuate periphery of the lower sheet 142 is similarly connected to the forward open rim of the transition section 54 by a tapered fill-in strip 148.

From the above description it will be apparent that as the flat mat-like sheet of crop material issuing from the feeder 24 passes rearwardly through the feed opening 145 and enters the transmission section 54 of the rotor casing 30, the material which is removed from the right hand side of the leading edge of the crop mat will be carried upwardly and around the upper region of the section 54 by the upwardly moving vanes 114 as previously described. This material will make camming or sliding engagement with the rear or inside surface of the slanting sheet 140 and thus have imparted thereto a small component of rearward movement in addition to its large component of counterclockwise circumferential movement. This rearward movement is further augmented by the provision of the fixed helical transport fins 115 on the inside surface of the transition section 54 and it is of sufficient magnitude that by the time the material has swept around the circular peripheral region of the upper sheet 140 it has been displaced well into the operating region of the impeller 32 and the blades 114 of the latter, in combination with the transport fins 115 of the transition section 54 and the transport fins 62 of the cylindrical section of the rotor casing 30, continue to impel the crop material axially and rearwardly through the casing where it is operated upon in the threshing area which embodies the concave 56 and the separating area which embodies the grate 58.

Considering now the casting 78 which, as aforementioned serves the multiple functions of establishing a bearing housing or support, providing a protective shield for the bearing, and establishing the offset antiwrap shed bar 80, the casting appears in FIGS. 1, 6, 7, 8 and 11 and it embodies a central hub portion 150 (FIGS. 6 and 7) from which the shed bar, which is of hollow construction, projects radially outwardly and has the outline of a relatively large offset lobe. The casting is transversely tapered and fixedly secured to the vertical web portion 86 of the bearing support bar 82 by means of bolts 152 or the like which pass through internal bosses 154 (FIG. 7) which are formed in the hollow shed bar 80.

The central hub portion 150 is generally of cupshape design and is provided with an internal annular recess 160 (FIG. 6) which defines an inner cylindrical wall 162 and an outer cylindrical wall 164, the shed bar 80 projecting outwardly from the outer wall 164. The bearing assembly 76 is preferably of the type which is commonly known as a spherical bearing and it includes an inner race member 166 which is fixedly mounted on the rotor shaft 74 and an outer race member 168 which is fixedly secured within the inner cylindrical wall 162. As best shown in FIGS. 2, 5, 6 and 7, the central hub 120 which supports the various impeller vanes 114 is provided with a circular sealing disk 170 which projects into the recess 160 and, in combination with the outer cylindrical wall 164 establishes a protective dust seal for the bearing assembly 76.

As previously stated, the function of the shed bar 80 is to divert the crop material which issues from the feeder 24 and passes through the crop inlet conduit 134 and thus prevent the crop material from bridging across the impeller blades. Reference to FIG. 7 will reveal the fact that the shed bar 80 is relatively wide, which is to say that its vertical width is of appreciable extent while its radial extent is even greater than its vertical width. The upper peripheral surface 171 of the shed bar 80 is of involute or spiral configuration, such surface opposing the direction of rotation of the impeller vanes 114. On this basis, the shed bar may be considered to be relatively massive and its outline is such that the crop material is given a clockwise direction of motion as viewed in FIG. 7 (such view being a rear view) so that the material will cam around the shed bar, so to speak, and be conducted to regions which are appreciably radially removed from the axis of the rotor shaft 74. The crop material which is thus conducted over the arcuate upper periphery of the shed bar is continuously forced radially outwardly along a generally evolute path and deposited in the peripheral region of the transition section 54.

From the above description it is believed that the nature and operation of the herein disclosed axial flow-type combine will be apparent without further detailed discussion, it being deemed sufficient to summarize the principal features of the present combine, these features being (1) the use of the frusto-conical transition section 54 in combination with a conformably shaped impeller 34 having blades 114 which closely fit the inner surface of such transition section; (2) the positioning of the two flat transition sheets 140 and 142 across the crop entrance mouth of the transition section 54 at different slant angles so that the upper sheet 140 guides the material which is severed from the leading end of the oncoming web of crop material at one side of the rotor housing 30 rearwardly and into the working area of the impeller 34, while the lower sheet 142 similarly guides the material which is severed from such leading end of the web at the other side of the rotor housing; and (3) the provision of the casting 78 which performs the dual function of supporting and shielding the bearing assembly 76 at the forward end of the rotor shaft 74, and of providing the fixed cropdiverting shed bar 78 which conducts the crop material radially outwardly and away from the rotor shaft 74 and its bearing assembly 76 to inhibit wrapping of the material around the impeller.

The invention is not to be limited to the exact arrangement of parts shown in the accompanying drawings or described in this specification as various changes in the details of construction may be resorted to without departing from the spirit of the invention. For example, although the rotor casing 30 has been illustrated as extending in the longitudinal direction of the combine, it is within the purview of the invention to construct the combine in such a manner that such casing extends transversely of the combine. Additionally, if desired, the rotor casing may assume any desired inclination on the combine chassis. In any event, the crop-receiving end of the casing will be regarded as being the forward end thereof although such end may not necessarily be at the forward end of the combine. Therefore, only insofar as the invention has particularly been pointed out in the accompanying claims is the same to be limited.

What is claimed is:

1. The combination with an axial flow combine having a chassis, an elongated tubular rotor casing on said chassis and defining a front crop-impelling region designed for endwise reception of crop material, a rear separating region, and an intermediate threshing region, a rotor disposed within said casing in coaxial relationship and substantially coextensive therewith, cooperating crop-threshing and crop-separating instrumentalities on said rotor and casing in said threshing and separating regions respectively, a vaned impeller on said rotor within said crop-impelling region and having radial vanes thereon for moving the crop material received in said latter region rearwardly into the threshing region, a rotor shaft projecting forwardly of said impeller, and an anti-friction bearing unit on said shaft immediately forwardly of said impeller, of combined bearing-supporting and crop-diverting means mounted on said chassis and embodying a hub encompassing said bearing unit and supporting the same, and a radially extending projection on said hub and having a curved side surface which faces in a direction opposing the direction of rotation of the impeller for diverting impeller-induced swirling crop material outwardly away from said rotor shaft.

2. The combination set forth in claim 1, wherein the radial extent of said projection is at least one-half the radial extent of the vanes on said impeller.

3. The combination set forth in claim 2, wherein the curved side surface of said radially extending projection is in the form of an involute curve designed for camming engagement with the swirling crop material.

4. The combination set forth in claim 1, wherein the curved side surface of said radially extending projection is in the form of an involute curve designed for camming engagement with the swirling crop material.

5. The combination set forth in claim 4, wherein said combined bearing-supporting and crop-diverting is in the form of an integral casting, and a plurality of fastening bolts project transversely through said radial projection and serve to secure the casting as a whole to said chassis.

6. The combination set forth in claim 5, wherein said projection is of hollow construction and embodies planar front and rear walls and a peripheral wall which defines said involute curve, said hub and walls defining an internal chamber within the projection.

7. The combination set forth in claim 5, wherein a support bar projects diametrically across said impeller region of the casing and constitutes an element of the chassis, and the casting is secured centrally to said support bar.

8. The combination set forth in claim 5, wherein said hub is provided with an annular recess therein defining inner and outer cylindrical walls, the bearing unit is encompassed by said inner wall, and the impeller is provided with a hub portion having a circular sealing disk which projects into said annular recess in sealing relationship relative to the rim of the latter.

9. The combination set forth in claim 8, wherein said bearing unit is of the ball bearing type and embodies an outer race which is fixedly confined by said inner wall and an inner race which is secured to the rotor shaft.

10. The combination set forth in claim 1, wherein said hub is provided with an annular recess therein defining inner and outer cylindrical walls, the bearing unit is encompassed by said inner wall, and the impeller is provided with a hub portion having a circular sealing disk which projects into said annular recess in sealing relationship relative to the rim of the latter.

11. The combination set forth in claim 10, wherein said bearing unit is of the ball bearing type and embodies an outer race which is fixedly confined by said inner wall and an inner race which is secured to the rotor shaft.

* * * * *